(12) United States Patent
Yoshikawa et al.

(10) Patent No.: US 7,922,097 B2
(45) Date of Patent: Apr. 12, 2011

(54) SIM CARD IC MODULE AND SIM CARD (75) Inventors: Yoshishige Yoshikawa, Shiga (JP); Norihiro Miyashita, Shiga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/677,015

(22) PCT Filed: Sep. 5, 2008

(86) PCT No.: PCT/JP2008/002465
§ 371 (c)(1),
(2), (4) Date: Mar. 8, 2010

(87) PCT Pub. No.: WO2009/031323
PCT Pub. Date: Mar. 12, 2009

(65) Prior Publication Data
US 2010/0176207 A1    Jul. 15, 2010

(30) Foreign Application Priority Data
Sep. 7, 2007   (JP) ................. 2007-232982

(51) Int. Cl.
*G06K 19/06* (2006.01)
(52) U.S. Cl. .............. 235/492; 340/5.53; 340/932.2
(58) Field of Classification Search .......... 235/492, 235/441; 340/5.53, 932.2
See application file for complete search history.

(56) References Cited

U.S. PATENT DOCUMENTS

| 5,146,232 | A | 9/1992 | Nishikawa et al. |
| 5,568,156 | A | 10/1996 | Terashima et al. |
| 5,675,347 | A | 10/1997 | Terashima et al. |
| 6,624,794 | B1 | 9/2003 | Wendt et al. |
| 6,634,564 | B2 | 10/2003 | Kuramochi |
| 6,958,732 | B2 | 10/2005 | Yuanzhu |
| 7,597,259 | B2 | 10/2009 | Nishikawa et al. |
| 2005/0212690 | A1* | 9/2005 | Nishikawa ............. 340/932.2 |
| 2006/0155913 | A1* | 7/2006 | Nishikawa et al. ......... 711/100 |
| 2007/0121537 | A1* | 5/2007 | Mullins et al. ............ 370/319 |

FOREIGN PATENT DOCUMENTS

| JP | 63-023404 A | 1/1988 |
| JP | 02-220505 A | 9/1990 |
| JP | 03-253106 A | 11/1991 |

(Continued)

OTHER PUBLICATIONS

International Search Report for International Application No. PCT/JP2008/002465, dated Oct. 7, 2008, 2 pages.

*Primary Examiner* — Allyson N Trail
(74) *Attorney, Agent, or Firm* — Brinks Hofer Gilson & Lione (57) ABSTRACT

The invention provides a SIM card IC module and a SIM card having a small antenna gain change. A SIM card 10 includes an IC module 11 including a circuit section 18 having a plurality of electronic components 16 mounted on a mounting surface 14A of a board 14, and an antenna 20 connected to the circuit section 18, and a plate-like base member 12 in which a recessed portion 22 for accommodating the circuit section 18 is provided. The antenna 20 is arranged to be substantially parallel to the mounting surface 14A, and has a three-dimensional structure arranged at a position shifted by a predetermined dimension from the mounting surface 14A along a thickness direction of the board 14.

22 Claims, 10 Drawing Sheets

FOREIGN PATENT DOCUMENTS

| | | |
|---|---|---|
| JP | 04-067805 A | 3/1992 |
| JP | 07-115313 A | 5/1995 |
| JP | 11-027030 A | 1/1999 |
| JP | 11-205424 A | 7/1999 |
| JP | 2001-326514 A | 11/2001 |
| JP | 2001-344583 A | 12/2001 |
| JP | 2002-203224 A | 7/2002 |
| JP | 2002-236901 A | 8/2002 |
| JP | 2003-500871 T | 1/2003 |
| JP | 2004-056413 A | 2/2004 |
| JP | 2004-139207 A | 5/2004 |
| JP | 2004-295480 A | 10/2004 |
| JP | 2004-355604 A | 12/2004 |
| JP | 2005-005866 A | 1/2005 |
| JP | 2005-157927 A | 6/2005 |
| JP | 2005-204188 A | 7/2005 |
| JP | 2005-234838 A | 9/2005 |
| JP | 2006-085391 A | 3/2006 |

* cited by examiner

SIM CARD IC MODULE AND SIM CARD

TECHNICAL FIELD

The present invention relates to a SIM card IC module having an antenna connected to a circuit section on which an electronic component is mounted, and a SIM card accommodating the IC module.

BACKGROUND ART

In a SIM card of the related art, a recessed portion is formed in a base member and an IC module is assembled to the recessed portion. A SIM card on which an antenna is provided has been proposed. Since this SIM card is available in contact and non-contact types, the convenience is excellent.

This SIM card has the antenna arranged along a peripheral edge portion of the base member, that is, along the surface direction of the base member, wherein the antenna is connected to the IC module (for example, see Patent Citation 1).
Patent Citation 1: JP-A-2004-139207

DISCLOSURE OF THE INVENTION

Technical Problem

However, there is a disadvantage in that a gain change is increased by a situation of use since the SIM card of Patent Citation 1 has the antenna arranged along the surface direction of the base member.

In particular, when a metal surface is arranged in contact with a card surface, there is a problem in that a gain is greatly decreased by a reverse current excited on the metal surface.

The present invention has been made to meet the above-described requirements, and an object of the invention is to provide a SIM card IC module and a SIM card having a small antenna gain change.

Technical Solution

A SIM card IC module of the present invention is a SIM card IC module including a board, a circuit section having a plurality of electronic components mounted on a mounting surface of the board, and an antenna connected to the circuit section, and constituting a SIM card by accommodating the IC module in a recessed portion of a base member formed in a plate shape, in which the antenna is arranged to be parallel to the mounting surface and arranged at a position shifted from the mounting surface by a predetermined dimension along a thickness direction of the board.

Here, the antenna has a structure three-dimensionally arranged on the mounting surface.

In general, the loop antenna is called a small loop antenna having a shorter loop length than a wavelength, and is classified as a "magnetic flow antenna".

The loop antenna has a characteristic that a gain change is greatly small when a loop axis is arranged to be horizontal to a ground surface or a conductor surface.

In the SIM card IC module of the present invention, the antenna is arranged to be parallel to the mounting surface and arranged at the position shifted from the mounting surface by the predetermined dimension along the thickness direction of the board.

Thereby, it is possible to suppress an antenna gain change to be small by the proximity of a metal surface or the like.

For example, when a SIM card inserted into a cellular phone is used, it is possible to suppress a gain change to be small even though the SIM card is arranged at any position of the cellular phone.

When a so-called "Osaifu-Keitai (registered trademark)" (Wallet Mobile) function (a function of executing a payment process by connecting a reader device to a cellular phone in a non-contact type by wireless communication) is provided by the cellular phone into which the SIM card has been inserted, communication is performed between the cellular phone and the reader device, and an authentication process is executed by detecting a distance from a radio wave intensity at the time.

At this time, highly accurate authentication is capable of being achieved since the distance is capable of being accurately detected by suppressing a radio wave change.

The present invention is characterized in that the antenna is a loop antenna having a horizontal portion which circulates along a surface intersecting with the mounting surface and is substantially parallel to the mounting surface.

The loop antenna which circulates along the surface intersecting with the mounting surface has the horizontal portion substantially parallel to the mounting surface, thereby suppressing an antenna gain change to be small.

The present invention is characterized in that the antenna includes: an antenna board; a pair of through-holes penetrating the antenna board in a thickness direction; and a conductor portion which connects the through-holes.

It is possible to improve the yield and omit the adjustment since the high pattern accuracy is obtained by employing the conductor portion of the antenna board such as the printed board or the like as the antenna.

Here, "layer stack" includes the mounting of a printed board forming an antenna pattern on a board (the connection by soldering) as well as the stack of layers at the time of manufacturing the printed board (that is, the configuration by a multi-layer board).

The present invention includes a pair of board through-holes which penetrate the board in a thickness direction and are conductible to the through-holes, and is characterized in that the circuit section is connected to the conductor portion via the through-holes and the board through-holes.

The present invention is capable of increasing a loop area and improving an antenna gain since the circuit section is connected to the conductor portion via the through-holes and the board through-holes.

The SIM card IC module and the SIM card of the present invention are characterized in that an external antenna terminal connectable to an external antenna is provided on the board.

Since the external antenna is arranged around a surface of a cellular phone and has a larger structure than the SIM card, a communication distance is capable of being greatly secured.

When a connection to the external antenna has been made, the communication distance is capable of being further extended by separating the loop antenna built in the SIM card.

On the other hand, since the external antenna is connected in parallel to the built-in antenna when the separation is not made, the communication distance becomes $1/\sqrt{2}$, but the simplification of configuration is capable of being promoted.

A SIM card of the present invention is a SIM card having an IC module including a board and a circuit section with a plurality of electronic components mounted on a mounting surface of the board, and a plate-like base member in which a recessed portion which accommodates the circuit section is provided, the SIM card including: a terminal portion connected to the circuit section and exposed on a surface of the IC module; and an antenna connected to the terminal portion, arranged to be parallel to the mounting surface, and arranged at a position shifted from the mounting surface by a predetermined dimension along a thickness direction of the board.

The antenna is capable of being provided outside the IC module or outside the base member by enabling a connection to the terminal portion at the IC module side to be made.

Thereby, it is possible to increase the degree of freedom in designing the IC module or the base member.

The present invention has a printed board on which a conductor is printed, and is characterized in that the antenna is formed by providing the printed board to return from a front side in which the recessed portion is provided in the base member to the front side via a backside in which no recessed portion is provided.

Thus, it is possible to increase the degree of freedom in designing the IC module or the base member since the antenna is capable of being provided outside the base member. It is possible to improve a gain since an antenna shape is capable of being maximally increased.

The present invention is characterized in that the antenna has a contact portion embedded into the base member and exposed on the recessed portion, and the terminal portion of the IC module accommodated in the recessed portion is in contact with the contact portion.

Thus, it is possible to increase the degree of freedom in designing the base member since the antenna is capable of being provided on the base member.

The present invention is characterized in that the antenna is formed by a conductor along the recessed portion, and the terminal portion of the IC module accommodated in the recessed portion is in contact with the conductor.

Thus, it is possible to increase the degree of freedom in designing the base member since the antenna is capable of being provided on the base member.

It is possible to improve the yield and omit the adjustment since the high pattern accuracy is obtained by forming the antenna by the conductor.

The printed board may be unnecessary by providing the conductor along the recessed portion, and the simplification of configuration is capable of being accommodated.

Advantageous Effects

A SIM card IC module and a SIM card of the present invention have the effect of suppressing an antenna gain change to be small since a loop antenna has a horizontal portion substantially parallel to a mounting surface and has a three-dimensional structure in the thickness direction of a board.

DETAILED DESCRIPTION OF THE PREFERRED EMBODIMENTS

Hereinafter, an input device according to an embodiment of the present invention will be described with reference to the drawings.

Figure 1:
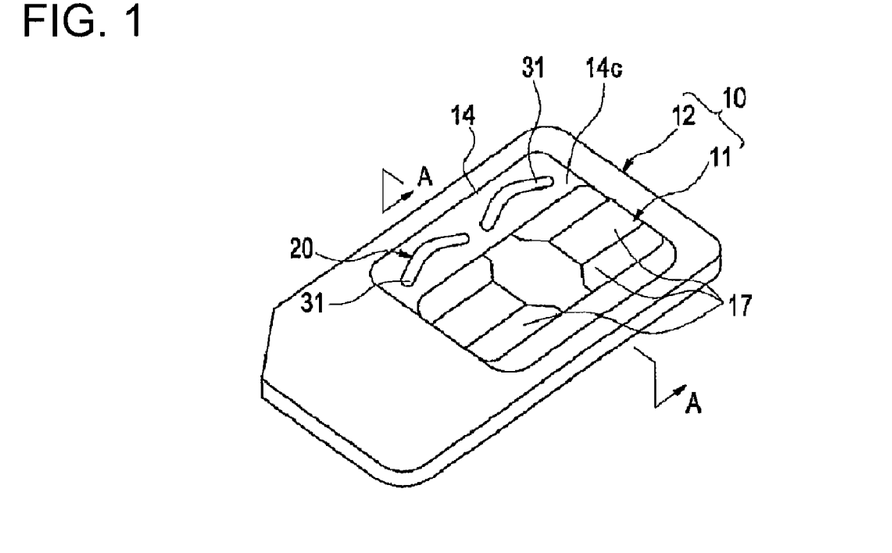
FIG. 1 is a perspective view showing a SIM card (a first embodiment) according to the present invention.
Figure 2:
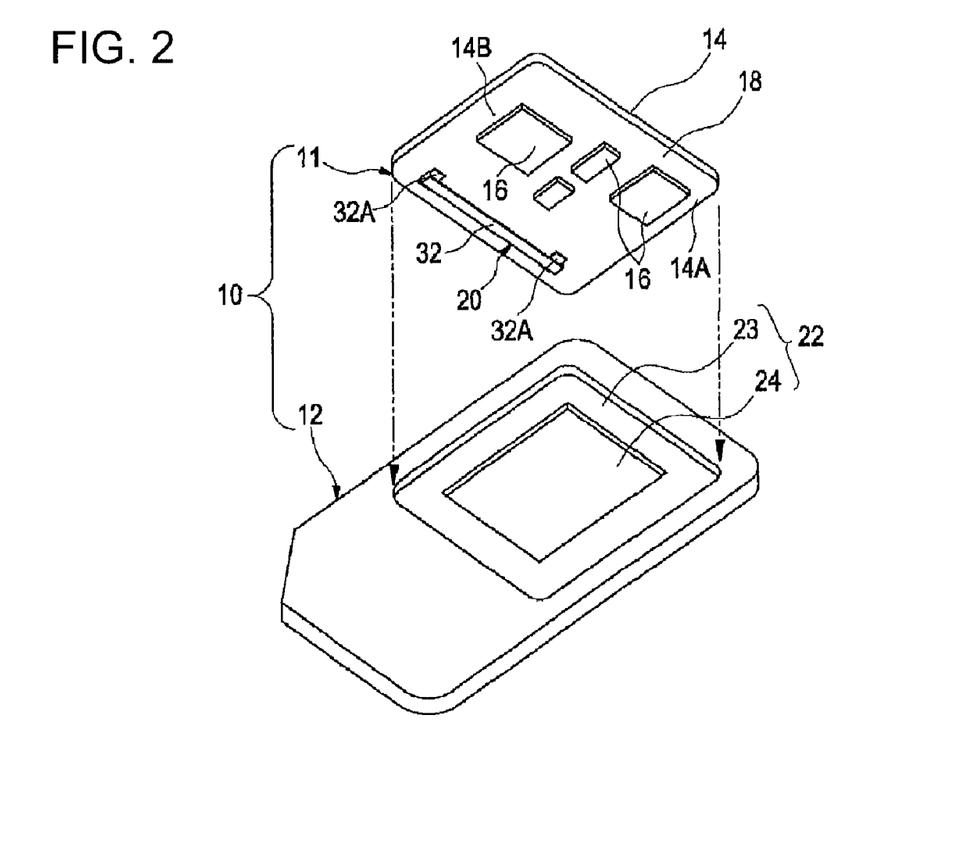
FIG. 2 is an exploded perspective view showing the SIM card of the first embodiment.
Figure 3:
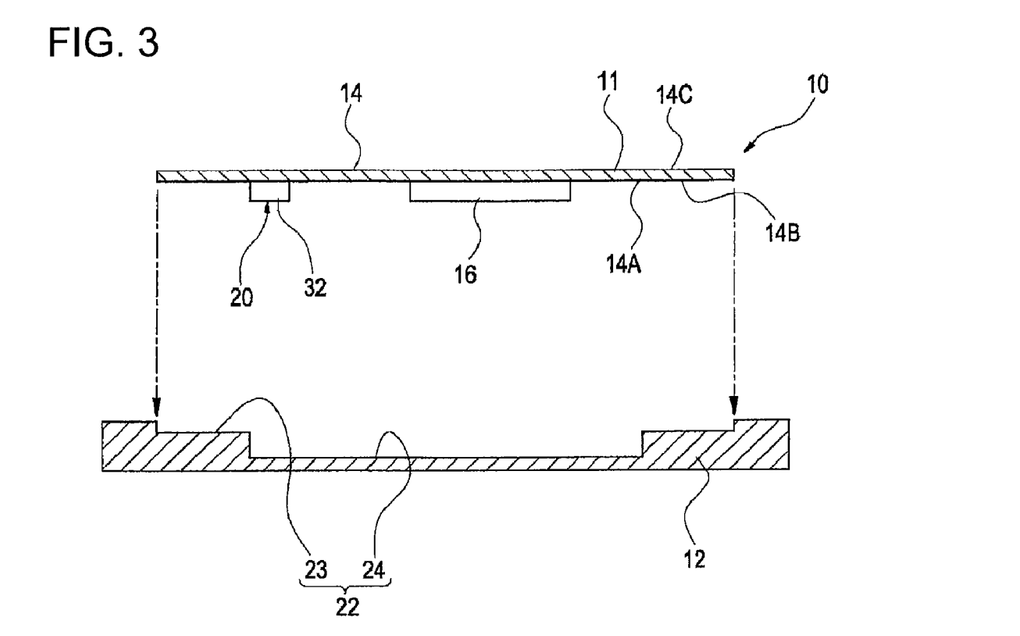
FIG. 3 is a cross-sectional view taken along line A-A of FIG. 1.

As shown in FIGS. 1 to 3, a SIM card 10 as a first embodiment of the present invention includes an IC module 11 and a plate-like base member 12 to which the IC module 11 has been assembled.

As shown in FIG. 2, the IC module 11 includes a board 14, a circuit section 18 having a plurality of electronic components 16 mounted on a mounting surface 14A of the board 14, and an antenna 20 connected to the circuit section 18.

The base member 12 is formed in a plate shape. A recessed portion 22 which accommodates the circuit section 18 is provided in the base member 12.

The recessed portion 22 has an adhesive recessed portion 23 for adhering a peripheral edge 14B of the mounting surface 14A of the board 14 and an accommodating recessed portion 24 which accommodates the circuit section 18.

The IC module 11 is assembled to the base member 12 by putting the peripheral edge 14B on the adhesive recessed portion 23 and adhering the peripheral edge 14B to the adhesive recessed portion 23 by an adhesive.

In this state, the circuit section 18 is housed within the accommodating recessed portion 24.

The mounting surface 14A of the board 14 is a surface on which a radio IC or a microcomputer IC and peripheral circuit components (electronic components) 16 thereof are mounted.

On the board 14, terminals 17 of the plurality of electronic components 16 are exposed on an exposed surface 14C opposite the mounting surface 14A (see FIG. 1).

The antenna 20 includes a first antenna 31 formed on the exposed surface 14C of the board 14 and connected to the circuit section 18 and a second antenna 32 connected to the first antenna 31 and having a portion separated in the thickness direction of the board 14.

The first antenna 31 has a pair of first terminals 31A (see FIG. 4) exposed from the mounting surface 14A.

Figure 4:
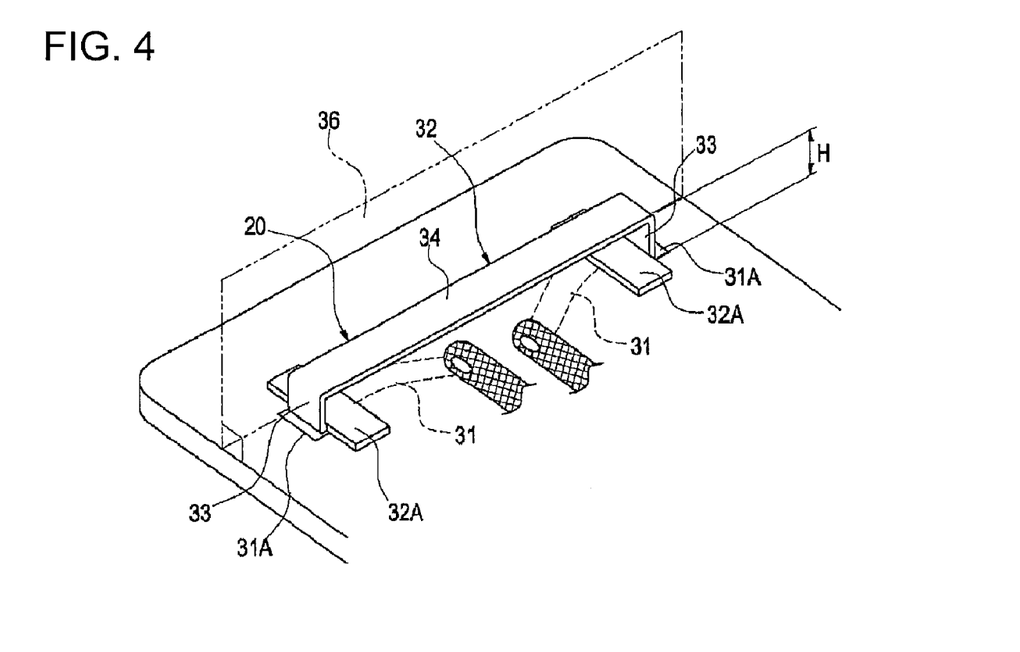
FIG. 4 is a perspective view showing an antenna provided on the SIM card of the first embodiment.

As shown in FIG. 4, the second antenna 32 is a metal member having a pair of second terminals 32A respectively connected to the pair of first terminals 31A, a pair of leg portions 33 respectively raised from the pair of second terminals 32A, and a horizontal portion 34 provided over the pair of leg portions 33.

The horizontal portion 34 is arranged to be substantially parallel to the mounting surface 14A, and has a three-dimensional structure arranged at a position shifted by a predetermined dimension H from the mounting surface 14A along the thickness direction of the board 14.

The horizontal portion 34 is arranged at the position shifted from the mounting surface 14A by the predetermined dimension H, thereby forming the second antenna 32 in a substantial C shape by the pair of second terminals 32A, the pair of leg portions 33, and the horizontal portion 34.

Accordingly, the pair of second terminals 32A are connected to the pair of first terminals 31A, thereby forming a loop antenna which circulates along a surface (a surface indicated by an imaginary line) 36 intersecting with the mounting surface 14A.

Balanced feeding of radio-frequency signals from two ends of the loop antenna is made.

A gain change of the antenna 20 can be suppressed to be small since it is possible to use the antenna 20 as the loop antenna by arranging the horizontal portion 34 to be substantially parallel to the mounting surface 14A using the antenna 20 as the loop antenna.

An antenna gain change depending upon an arrangement state of the SIM card 10 is suppressed in the SIM card by suppressing a radio-frequency current from flowing outside an antenna section of the SIM card 10.

An air core coil structure is formed by constituting the second antenna 32 by a metal member. Since a Q factor can be increased as the parasitic capacitance from a dielectric substance is decreased, the antenna gain can be improved.

Miniaturization can be promoted since electronic components can be mounted just below the horizontal portion 34 by arranging the horizontal portion 34 at the position shifted from the mounting surface 14A by the predetermined dimension H.

As the loop antenna is constituted to have an axis (the horizontal portion 34) of a loop parallel to the mounting surface 14A as described above, the gain decrease is suppressed when the SIM card 10 is arranged in contact with a metal surface such as a battery. As balanced feeding is made, a radio-frequency signal flows through the entirety of the SIM card 10 when the SIM card 10 is arranged to be separated from the metal surface, and an increase in the antenna gain is suppressed.

Thereby, the antenna gain can be maintained to be substantially constant without depending upon an installation state of the SIM card 10.

Next, second to seventh embodiments will be described on the basis of FIGS. 5 to 13. Elements of the second to seventh embodiments, which are the same as, or similar to, those of the SIM card 10 of the first embodiment are denoted by the same reference numerals, and detailed description thereof is omitted.

Second Embodiment

Figure 5:
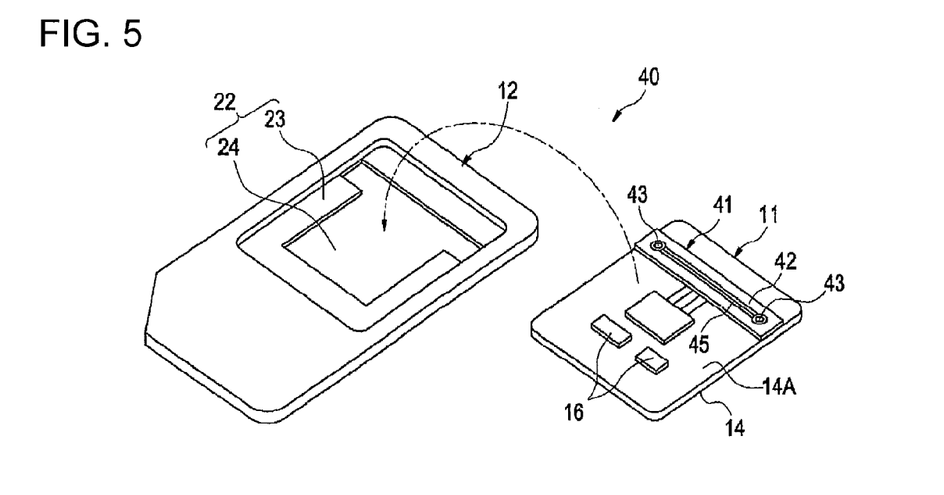
FIG. 5 is a perspective view showing a SIM card (a second embodiment) according to the present invention.
Figure 6:
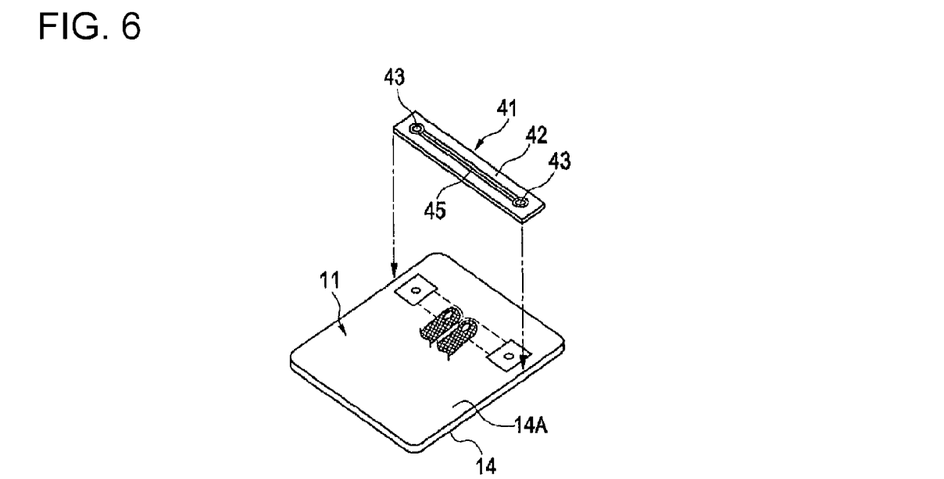
FIG. 6 is an exploded perspective view showing an IC module of the second embodiment.

A SIM card 40 of the second embodiment shown in FIGS. 5 and 6 is provided with a second antenna 41 in place of the second antenna 32 of the first embodiment, and a configuration thereof is the same as the SIM card 10 of the first embodiment.

The second antenna 41 has an antenna board 42, a pair of through-holes 43 penetrating the antenna board 42 in the thickness direction, and a conductor portion (horizontal portion) 45 which connects the through-holes 43. The antenna board 42 is considered as a printed board, and is layered on a mounting surface 14A of a board 14, thereby forming the second antenna 41.

The conductor portion 45 is arranged to be substantially parallel to the mounting surface 14A, and is arranged at a position shifted from the mounting surface 14A by a predetermined dimension H along the thickness direction of the board 14.

Accordingly, the SIM card 40 of the second embodiment can have the same advantageous effect as the SIM card 10 of the first embodiment.

According to the SIM card 40 of the second embodiment, it is possible to improve the yield and omit the adjustment since the high pattern accuracy is obtained by employing the conductor portion 45 of the printed board as the antenna board 42 as the second antenna 41.

Third Embodiment

Figure 7:
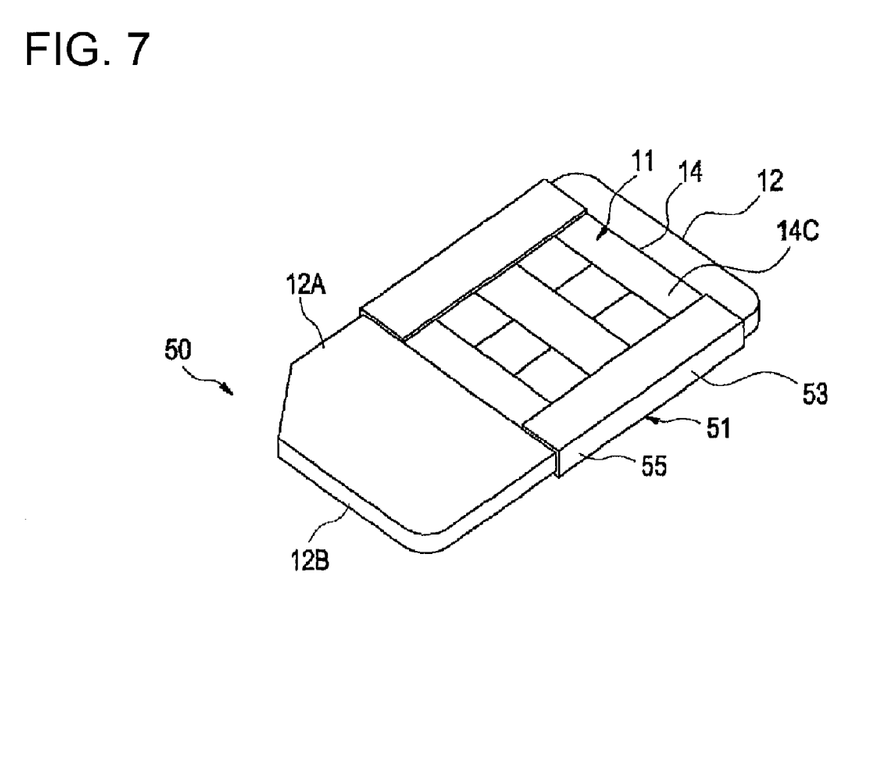
FIG. 7 is a perspective view showing a SIM card (a third embodiment) according to the present invention.
Figure 8:
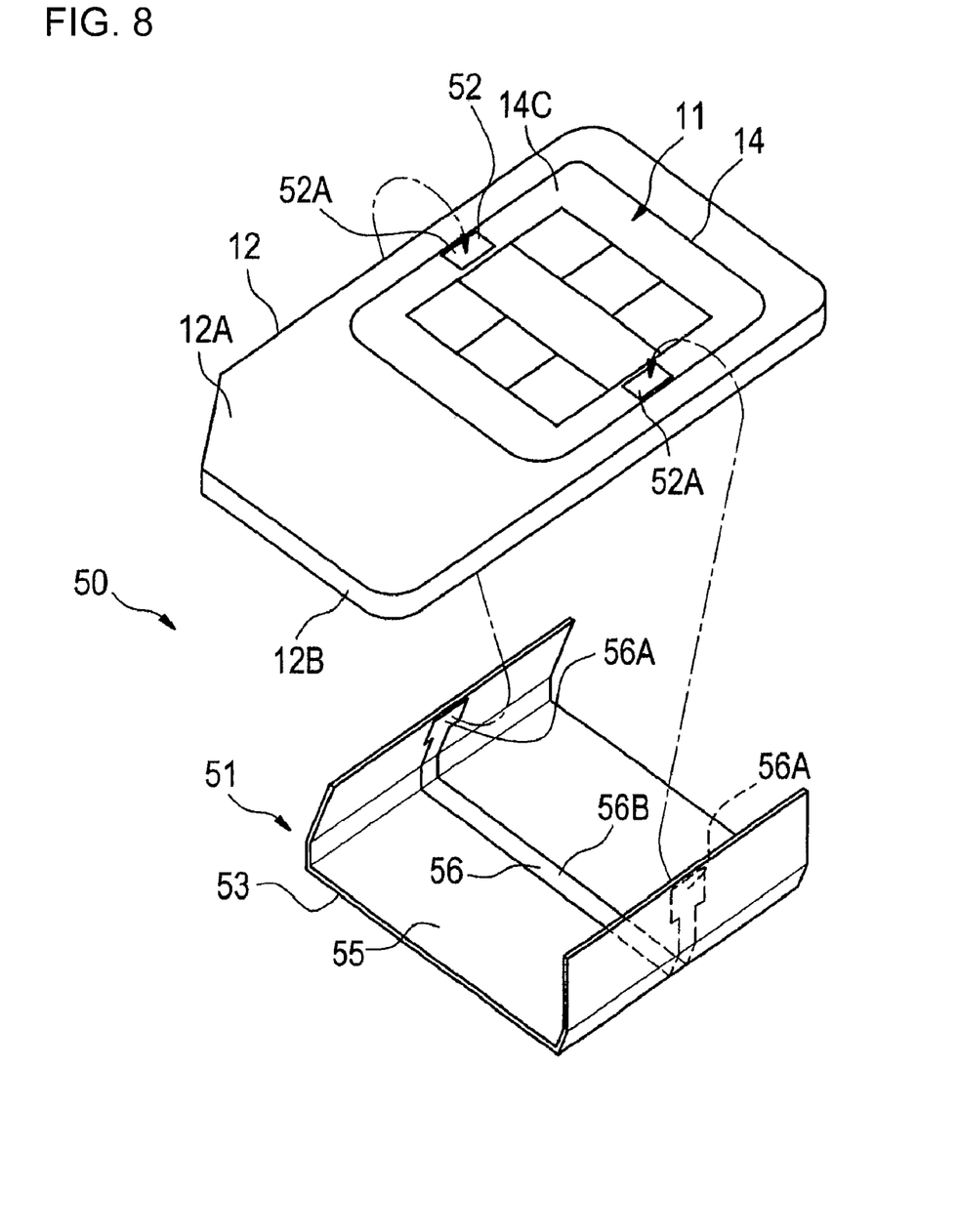
FIG. 8 is an exploded perspective view showing the SIM card of the third embodiment.

A SIM card 50 of the third embodiment shown in FIGS. 7 and 8 is provided with an antenna 51 in place of the antenna 20 of the first embodiment, and a configuration thereof is the same as the SIM card 10 of the first embodiment.

The antenna 51 has a first antenna 52 and a second antenna 53.

The first antenna 52 is connected to a circuit portion 18 shown in FIG. 2, and a pair of terminal portions 52A are exposed on an exposed surface (a surface of the IC module) 14C of a board 14.

The second antenna 53 has a sheet-like printed board 55 on which a conductor 56 is printed.

The printed board 55 of the second antenna 53 is folded to return from a front side 12A in which a recessed portion 22 (see FIG. 2) of a base member 12 is provided to the front side 12A via a backside 12B in which no recessed portion 22 is provided.

Accordingly, two end portions 56A of the conductor 56 of the second antenna 53 are connected to the terminal portions 52A of the first antenna 52. A horizontal portion 56B of the conductor 56 is arranged to be parallel to the mounting surface 14A (see FIG. 2), and is arranged at a position shifted from the mounting surface 14A by a predetermined dimension H along the thickness direction of the board 14.

Thereby, the antenna 51 is the loop antenna formed by the first antenna 52 and the second antenna 53.

Accordingly, the SIM card 50 of the third embodiment can have the same advantageous effect as the SIM card 10 of the first embodiment.

According to the SIM card 50 of the third embodiment, it is possible to arrange the second antenna 53 outside the base member 12. It is possible to increase the degree of freedom in designing the IC module 11 or the base member 12.

It is possible to increase a loop area and improve an antenna gain.

Fourth Embodiment

Figure 9:
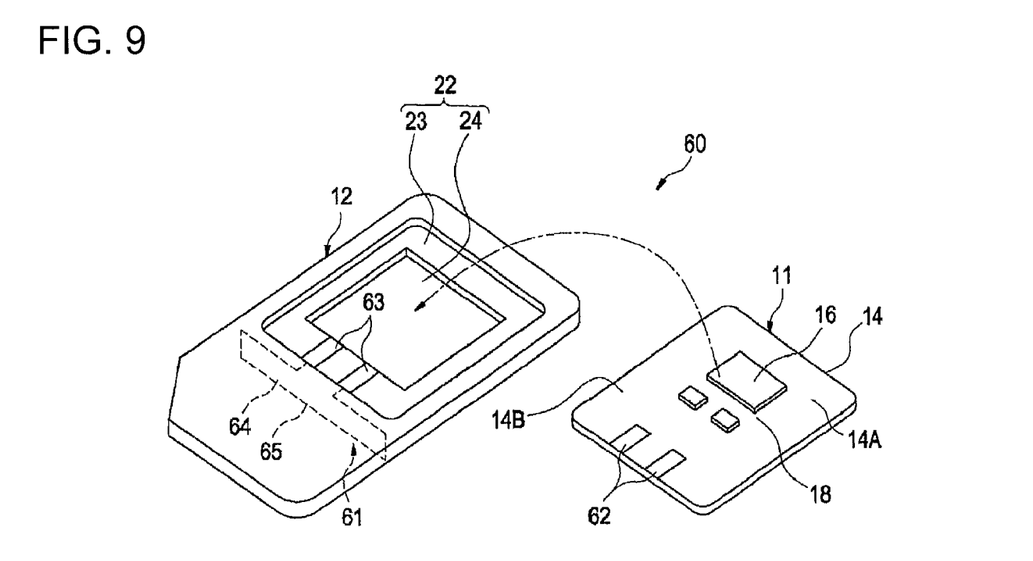
FIG. 9 is an exploded perspective view showing a SIM card (a fourth embodiment) according to the present invention.

A SIM card 60 of the fourth embodiment shown in FIG. 9 is provided with an antenna 61 in place of the antenna 20 of the first embodiment, and a configuration thereof is the same as the SIM card 10 of the first embodiment.

The antenna 61 has a pair of terminal portions 62 connected to a circuit section 18 and exposed on a mounting surface (a surface of an IC module 11) 14A, a pair of contact portions 63 respectively connected to the pair of terminal portions 62, and a loop antenna 64 connected to the pair of contact portions 63.

The pair of contact portions 63 are terminals embedded into the base member 12 and exposed on a recessed portion 22.

The loop antenna 64 has a horizontal portion 65 which is embedded into the base member 12, arranged to be parallel to the mounting surface 14A, and arranged at a position shifted from the mounting surface 14A by a predetermined dimension H along the thickness direction of a board 14.

As the IC module 11 is accommodated (assembled) in the recessed portion 22, the pair of terminal portions 62 are respectively in contact with the pair of contact portions 63.

As the pair of terminal portions 62 are respectively connected to the pair of contact portions 63, the loop antenna 64 is connected to the circuit section 18.

Accordingly, the SIM card 60 of the fourth embodiment can have the same advantageous effect as the SIM card 10 of the first embodiment.

According to the SIM card 60 of the fourth embodiment, it is possible to increase the degree of freedom in designing the IC module 11 by embedding the loop antenna 64 into the base member 12 outside the IC module 11.

Fifth Embodiment

Figure 10:
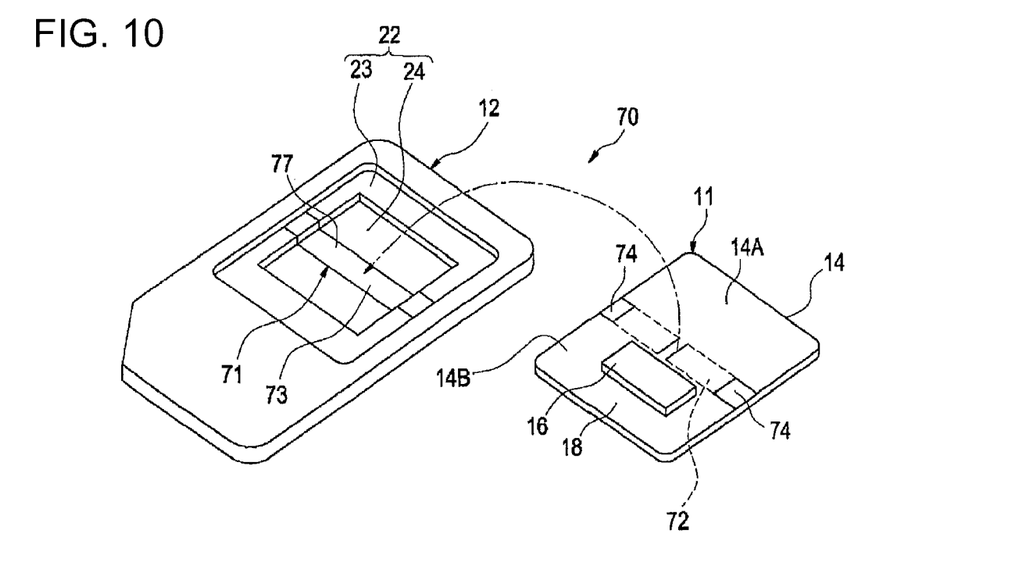
FIG. 10 is an exploded perspective view showing a SIM card (a fifth embodiment) according to the present invention.

A SIM card 70 of the fifth embodiment shown in FIG. 10 is provided with an antenna 71 in place of the antenna 20 of the first embodiment, and a configuration thereof is the same as the SIM card 10 of the first embodiment.

The antenna 71 has a first conductor 72 formed along a board 14 and a second conductor (conductor) 73 connected to the first conductor 72.

The first conductor 72 has a pair of terminal portions 74 connected to a circuit section 18 and exposed on a mounting surface (a surface of an IC module 11) 14A.

The second conductor 73 constitutes an antenna to be formed along a recessed portion 22, and two end portions 75 are exposed on an adhesive recessed portion 23.

The second conductor 73 has a horizontal portion 77 arranged to be parallel to the mounting surface 14A and arranged at a position shifted from the mounting surface 14A by a predetermined dimension H along the thickness direction of the board 14.

As an IC module 11 is accommodated (assembled) in the recessed portion 22, the pair of terminal portions 74 are respectively in contact with the two end portions 75.

As the pair of terminal portions 74 are respectively connected to the two end portions 75, a loop antenna is formed by the first conductor 72 and the second conductor 73.

Accordingly, the SIM card 70 of the fifth embodiment can have the same advantageous effect as the SIM card 10 of the first embodiment.

According to the SIM card 70 of the fifth embodiment, it is possible to increase the degree of freedom in designing the IC module 11 by forming the second conductor 73 as the antenna along the recessed portion 22 outside the IC module 11.

According to the SIM card 70 of the fifth embodiment, it is possible to improve the yield and omit the adjustment since the high pattern accuracy is obtained by forming the antenna 71 by the first conductor 72 and the second conductor 73.

A printed board may be unnecessary by providing the second conductor 73 along the recessed portion 22, and the simplification of configuration can be promoted.

Sixth Embodiment

Figure 11:
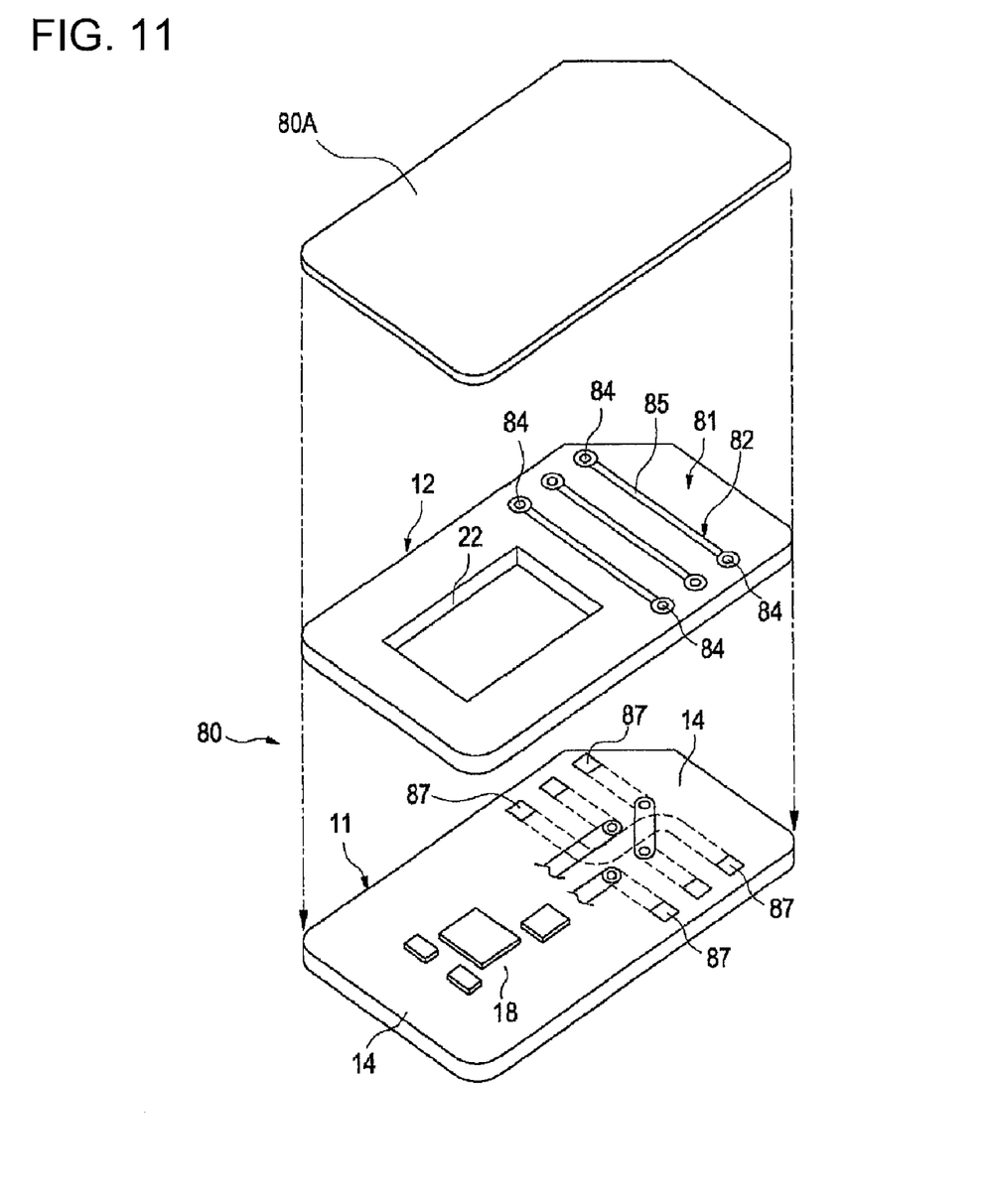
FIG. 11 is an exploded perspective view showing a state when a SIM card (a sixth embodiment) according to the present invention is viewed from an obliquely upward direction.
Figure 12:
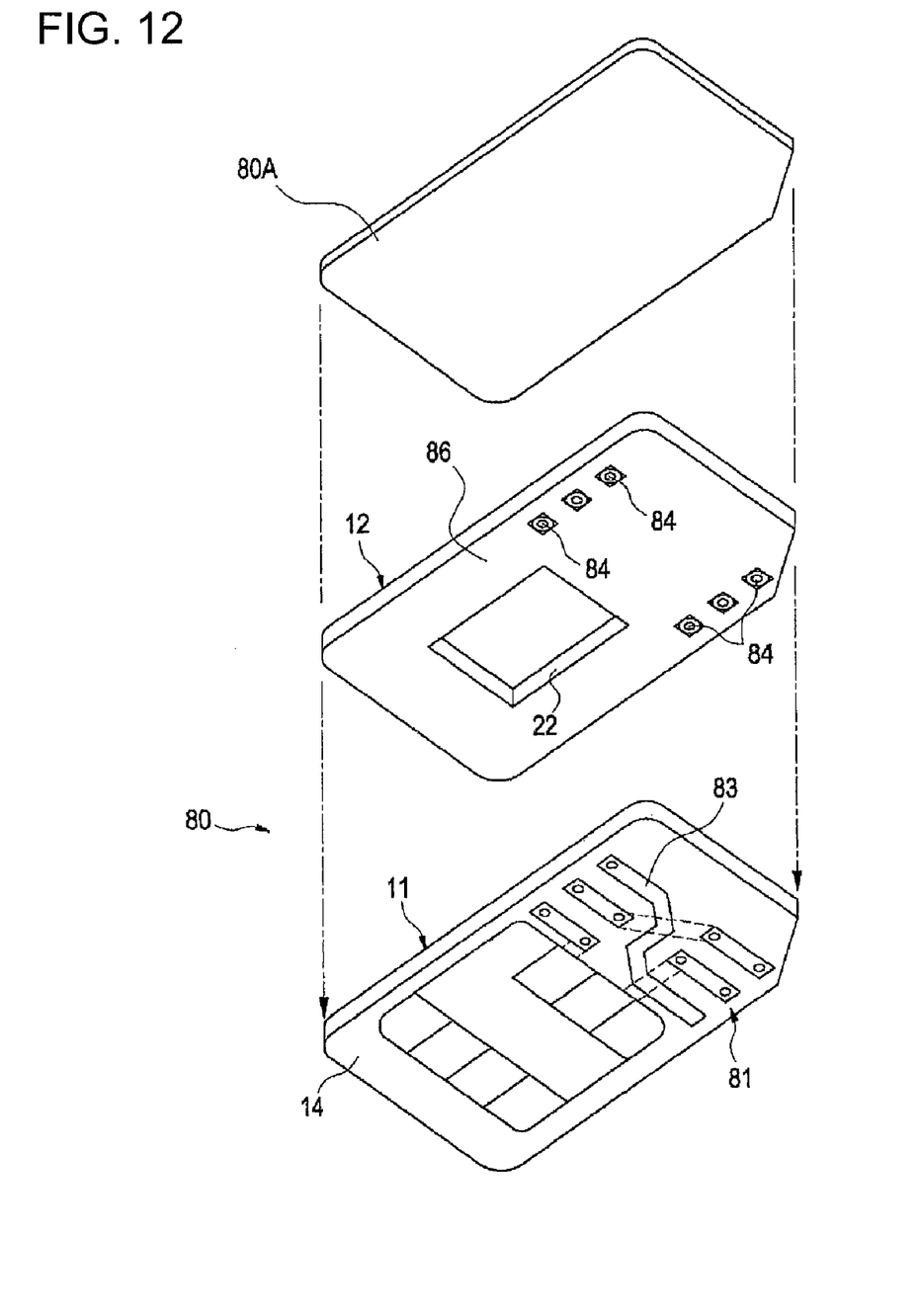
FIG. 12 is an exploded perspective view showing a state when the SIM card of the sixth embodiment is viewed from an obliquely downward direction.

A SIM card 80 of the sixth embodiment shown in FIGS. 11 and 12 is provided with an antenna 81 in place of the antenna 20 of the first embodiment, and a configuration thereof is the same as the SIM card 10 of the first embodiment.

The antenna 81 has a first antenna 82 formed around the surface of a base member 12 and a second antenna 83 formed around the surface of a board 14.

The first antenna 82 has a plurality of through-holes 84 penetrating the base member 12 in the thickness direction and a first conductor 85 which connects the pair of through-holes 84. The first antenna 82 is covered with a cover seal 80A.

A through-hole (or recessed portion) 22 is formed and a plurality of through-holes 84 is exposed on a surface 86 facing the board 14.

The first conductor 85 is arranged to be parallel to a mounting surface 14A and is arranged at a position shifted from the board 14 by a predetermined dimension H along the thickness direction of the board 14.

The second antenna 83 has a plurality of terminal portions 87 embedded into the board 14 and exposed on the mounting surface 14A.

As a circuit section 18 of an IC module 11 is accommodated in the through-hole 22, the terminal portions 87 are respectively in contact with the through-holes 84.

As the terminal portions 87 are respectively connected to the through-holes 84, a loop antenna is formed by the first antenna 82 and the second antenna 83.

In this embodiment, the case where the number of turns of the loop antenna is 3 is shown. In the present invention, the number of turns of the loop antenna may be 1, 2, 4, or more.

Accordingly, the SIM card 80 of the sixth embodiment can have the same advantageous effect as the SIM card 10 of the first embodiment.

According to the SIM card 80 of the sixth embodiment, it is possible to increase the degree of freedom in designing the IC module 11 by providing the first antenna 82 on the base member 12 outside the IC module 11.

Seventh Embodiment

Figure 13A:
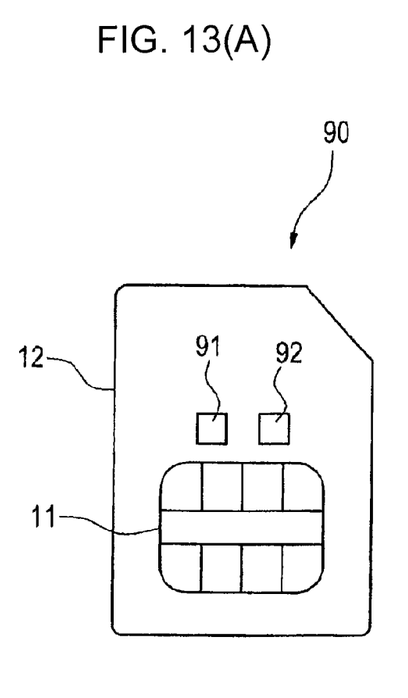
FIG. 13(A) is a plan view showing a SIM card (a seventh embodiment) according to the present invention.

A SIM card 90 of the seventh embodiment shown in FIG. 13(A) is constituted by providing external antenna terminals 91 and 92 connectable to an external antenna (not shown) on the SIM card 10 of the first embodiment, and a configuration thereof is the same as that of the SIM card 10 of the first embodiment.

The external antenna terminals 91 and 92 are provided on a surface 12A of a base member 12.

For example, the external antenna (not shown) is arranged around the surface of a cellular phone, and has a larger structure than the SIM card 80, thereby securing a great communication distance.

When a connection to the external antenna of the cellular phone has been made, the communication distance can be further extended by separating the loop antenna built in the SIM card 90.

On the other hand, when the separation is not made, a transmission output signal is divided into two of the external antenna of the cellular phone and the built-in antenna, so that the communication distance becomes $1/\sqrt{2}$, but the simplification of configuration can be promoted.

Figure 13B:
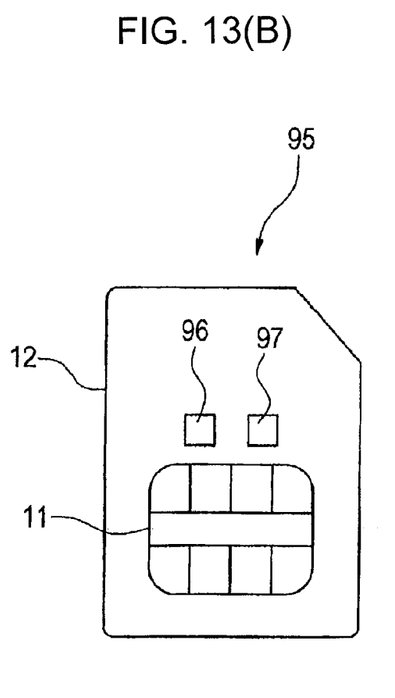
FIG. 13(B) is a plan view of a SIM card showing a modified example of the seventh embodiment.

A SIM card 95 of the modified example of the seventh embodiment shown in FIG. 13(B) is provided with external antenna terminals 96 and 97 for which balanced feeding is possible in place of the external antenna terminals 91 and 92 of the SIM card 90 of the seventh embodiment.

According to the SIM card 95 of the modified example, the balanced feeding is possible. An antenna gain change can be suppressed, and a DC cut can be formed. Further, it is not necessary to adjust a DC level with the external antenna.

Eighth Embodiment

Figure 14A:
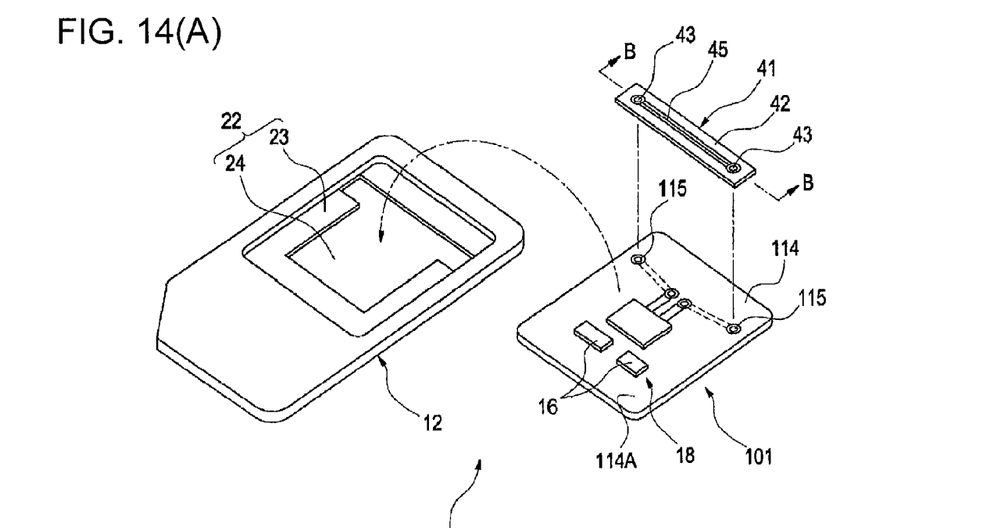
FIG. 14(A) is an exploded perspective view showing a SIM card (an eighth embodiment) according to the present invention.

A SIM card 100 of the eighth embodiment shown in FIG. 14(A) is a modified example of the above-described second embodiment, and has a pair of board through-holes 115 and 115 penetrating a board 114 of an IC module 101 in the thickness direction.

Figure 14B:
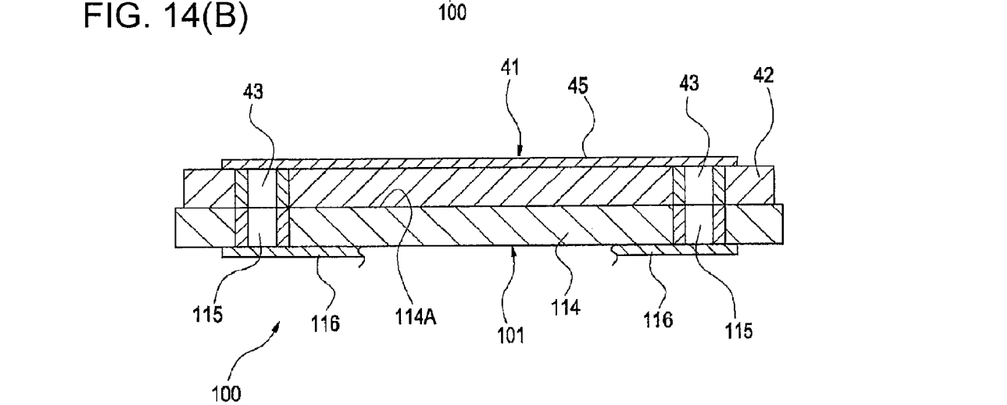
FIG. 14(B) is a cross-sectional view thereof.

As shown in FIG. 14(B), the through-holes 115 and 115 are connected to a circuit section 18 of a mounting surface 114A via a wiring 116 which is conductible to a through-hole 43 of an antenna board 42 and is provided on the backside of the board 114.

The eighth embodiment has an advantageous effect of improving an antenna gain since the loop height of the second antenna 41 as the loop antenna can be greatly secured by the through-holes 43 of the antenna board 42 and the board through-holes 115 and 115.

The shapes of elements such as the IC module 11, and the base member 12, the board 14, the antennas 20, 51, 61, 71, and 81 or the recessed portion 22 illustrated in the above-described embodiments may be appropriately changed.

INDUSTRIAL APPLICABILITY

The present invention has an IC module in which an antenna is connected to a circuit section on which an electronic component is mounted, and may preferably be applicable to a SIM card in which the IC module is accommodated.

What is claimed is:

1. A SIM card IC module comprising a board,
a circuit section having a plurality of electronic components mounted on a mounting surface of the board, and an antenna connected to the circuit section, and constituting a SIM card by accommodating the IC module in a recessed portion of a base member formed in a plate shape,
wherein the antenna is arranged to be parallel to the mounting surface and arranged at a position shifted from the mounting surface by a predetermined dimension along a thickness direction of the board.

2. The SIM card IC module according to claim 1, wherein the antenna is a loop antenna having a horizontal portion which circulates along a surface intersecting with the mounting surface and is substantially parallel to the mounting surface.

3. The SIM card IC module according to claim 1, wherein the antenna includes: an antenna board; a pair of through-holes penetrating the antenna board in a thickness direction; and a conductor portion which connects the through-holes.

4. The SIM card IC module according to claim 3, comprising:
a pair of board through-holes which penetrate the board in a thickness direction and are conductible to the through-holes,
wherein the circuit section is connected to the conductor portion via the through-holes and the board through-holes.

5. The SIM card IC module according to claim 1, wherein an external antenna terminal connectable to an external antenna is provided on the board.

6. A SIM card having an IC module including a board and a circuit section with a plurality of electronic components mounted on a mounting surface of the board, and a plate-like base member in which a recessed portion which accommodates the circuit section is provided, the SIM card comprising:
a terminal portion connected to the circuit section and exposed on a surface of the IC module; and
an antenna connected to the terminal portion, arranged to be parallel to the mounting surface, and arranged at a position shifted from the mounting surface by a predetermined dimension along a thickness direction of the board, wherein the antenna is a loop antenna looping in a plane intersecting with the mounting surface and having a section substantially parallel to the mounting surface.

7. The SIM card according to claim 6, comprising:
a printed board on which a conductor is printed,
wherein the antenna is formed by providing the printed board to return from a front side in which the recessed portion is provided in the base member to the front side via a backside in which no recessed portion is provided.

8. The SIM card according to claim 6, wherein the antenna has a contact portion embedded into the base member and exposed on the recessed portion, and the terminal portion of the IC module accommodated in the recessed portion is in contact with the contact portion.

9. The SIM card according to claim 6, wherein the antenna is formed by a conductor along the recessed portion, and the terminal portion of the IC module accommodated in the recessed portion is in contact with the conductor.

10. The SIM card according to claim 6, wherein an external antenna terminal connectable to an external antenna is provided on a surface of the base member.

11. A SIM card IC module receivable in a SIM base plate, comprising:
a board;
a circuit section having a plurality of electronic components mounted on a mounting surface of the board, wherein the mounting surface has a first side, the electronic components being mounted on the first side of the mounting surface, and a second side opposite to the first side; and
an antenna connected to the circuit section, wherein the antenna comprises a first segment running, on the first side of the mounting surface, spaced apart by a predetermined distance from and in substantially parallel to the mounting surface and a second segment running on the second side of the mounting surface.

12. The SIM card IC module according to claim 11, wherein the antenna is a loop antenna looping in a plane intersecting with the mounting surface and having a section substantially parallel to the mounting surface.

13. The SIM card IC module according to claim 11, further comprising an antenna board having a thickness substantially equal to the predetermined distance and placed on the mounting surface of the board, a conductive line running on a surface of the antenna board opposite to the mounting surface, wherein the second segment of the antenna constitutes at least a part of the conductive line.

14. The SIM card IC module according to claim 13, wherein the board and the antenna board are each formed with a pair of through-holes aligned through the board and the antenna board, and the conductive line is connected to the circuit section via the through-holes of the board and the antenna board.

15. The SIM card IC module according to claim 11, wherein the board is provided with external antenna terminals connectable to an external antenna.

16. The SIM card IC module according to claim 11, wherein the second segment is formed on a surface of the board opposite to the mounting surface.

17. The SIM card IC module according to claim 11, wherein the first segment constitutes at least a part of a conductive bar running in substantially parallel to the mounting surface and mounted on the mounting surface with legs attached to ends of the bar.

18. A SIM card comprising:
- an IC module comprising a board and a circuit section with a plurality of electronic components mounted on a mounting surface of the board, wherein the mounting surface defines a first side, the electronic components being mounted on the first side of the mounting surface, and a second side opposite to the first side;
- a base plate to which the IC module is attached, wherein the base plate is formed with a recess for receiving the circuit section; and
- an antenna connected to the circuit section, wherein the antenna comprises a first segment running, on the first side of the mounting surface, spaced apart by a predetermined distance from and in substantially parallel to the mounting surface and a second segment running on the second side of the mounting surface.

19. The SIM card according to claim 18, comprising a coat that at least partially surrounds the SIM card, the coat having a first area extensive across a surface of the SIM card on the first side of the mounting surface and a second area extensive to cover at least a part of an opposite surface of the SIM card on the second side of the mounting surface and being coated with a conductive line extensive through the first and second areas, wherein the first segment of the antenna constitutes at least a part of the conductive line running in the first area, and the second segment thereof constitutes at least a part of the conductive line running in the second area.

20. The SIM card according to claim 18, wherein the antenna is formed in the base plate and connected to the circuit section of the IC module via contacts formed in the recess of the base plate.

21. The SIM card according to claim 18, wherein a conductive line is formed in a bottom of the recess and connected to the circuit section of the IC module via contacts formed in the recess, and the second segment of the antenna constitutes at least a part of the conductive line.

22. The SIM card according to claim 18, wherein the base plate is provided with external antenna terminals connectable to an external antenna.

\* \* \* \* \*